Feb. 2, 1937. K. M. WHITE 2,069,510
CONTROL SYSTEM
Filed Aug. 31, 1935 3 Sheets-Sheet 1
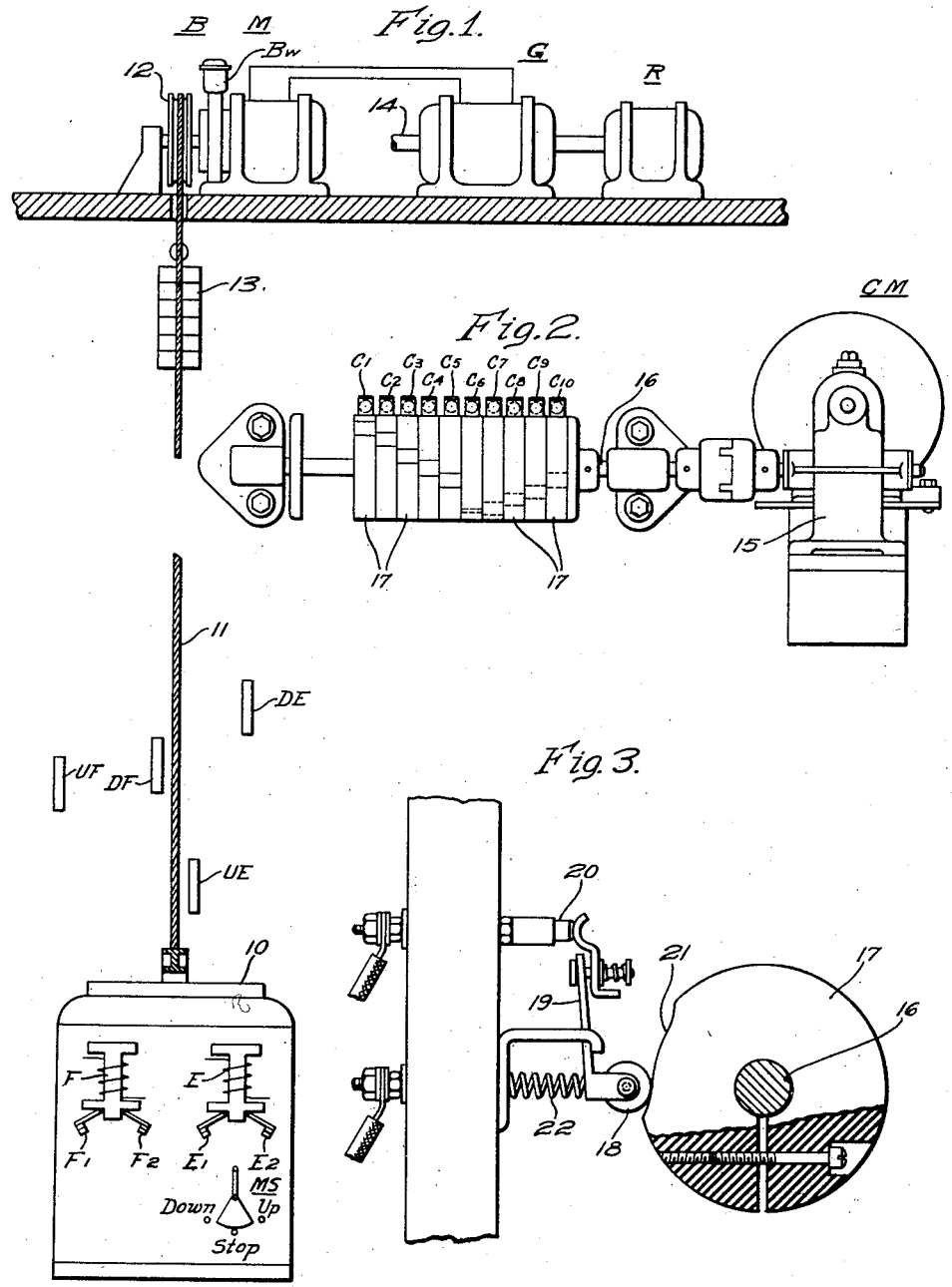
WITNESSES:
C. J. Weller.
R. R. Lockwood
INVENTOR
Kenneth M. White.
BY
ATTORNEY Feb. 2, 1937. K. M. WHITE 2,069,510
CONTROL SYSTEM
Filed Aug. 31, 1935    3 Sheets-Sheet 2

WITNESSES:
C. J. Weller.
R. R. Lockwood

INVENTOR
Kenneth M. White.
BY
ATTORNEY

Feb. 2, 1937.　　　　K. M. WHITE　　　　2,069,510
CONTROL SYSTEM
Filed Aug. 31, 1935　　　3 Sheets-Sheet 3

WITNESSES:
C. J. Weller.
R. R. Lockwood

INVENTOR
Kenneth M. White.
BY
ATTORNEY

Patented Feb. 2, 1937

2,069,510

UNITED STATES PATENT OFFICE 2,069,510

CONTROL SYSTEM

Kenneth M. White, Tenafly, N. J., assignor to Westinghouse Electric Elevator Company, Chicago, Ill., a corporation of Illinois.

Application August 13, 1935, Serial No. 38,771

15 Claims. (Cl. 172—239)

My invention relates, generally, to electric control systems, and it has particularly relation to control systems of the Ward-Leonard type.

Control systems of the Ward-Leonard type have many applications in which they are employed under widely varying conditions. In particular, when a system of this type is employed for controlling the operation of an elevator car a wide range of operating conditions is met. It is not only necessary to move the elevator car upwardly in the hatchway or shaft, but it is also necessary to permit it to move downwardly, both under widely varying load and other conditions.

In controlling the operation of an elevator car with a Ward-Leonard system a motor is provided which is arranged to be mechanically connected to the elevator car by cables for moving the elevator car in both directions. Ordinarily, the motor is provided with a separately excited field winding and the desired direction of movement of the car effected by reversing the polarity applied to its armature. The motor is arranged to be energized from a generator which may be provided with a series field winding to compensate for the IR drop in its armature circuit, in the armature circuit of the motor, and in the leads interconnecting the armatures. The generator is provided with a separately excited main field winding, the current through which is arranged to be controlled and reversed in order to operate the motor and the load attached thereto, for example, the elevator car, at various speeds in either direction of travel. The excitation of the main field winding of the generator may be controlled by means of a rheostat or the combination of various resistors and suitable control devices for inserting various steps of the resistor in circuit with the main field winding. For each step of the controller which alters the current flowing through the main field winding of the generator there is a particular speed of operation of the motor which is desired. Any departure in speed from this desired value introduces undesirable operating conditions in the functioning of the system.

If it were possible to maintain all of the conditions in a control system of the Ward-Leonard type absolutely constant, it would then be possible to obtain an exact relationship between the speed of the motor and the setting of the controller which regulates the flow of current through the main field winding of the generator. Due to the physical constants and characteristics of the system, however, it is not possible to achieve such a result without the use of a compensating system of some type. This is particularly true when the Ward-Leonard control system is employed to control the movement of an elevator car in a hatchway. In such case, additional variables enter into the functioning of the system which make it difficult to maintain the speed of the elevator car under all conditions in correspondence to the setting of the controller for the main field winding of the generator.

In connection with the elevator car itself, it operates under two extremes of conditions, that is, full load up and full load down. When the elevator car is operated with full load in the up direction, the motor has applied thereto maximum power from the generator. Under these conditions, it is necessary for the load to be lifted against the force of gravity. When the elevator car is operating in the down direction under full load, the functioning of the motor is reversed and it operates as a generator to cause the generator to function as a motor and to return power to the power source in the event that the generator is arranged to be driven by means of a motor such as an alternating-current motor. A further variable factor which enters into the functioning of the elevator car is the friction which it encounters in its movement along the hatchway. When the elevator car is first installed, this friction may be relatively great but it lessens in effect as the car is used over a period of time.

In the motor which is connected to drive the elevator car various changes in its operating conditions occur which affect its speed. The resistance losses of the motor due to changes in temperature constitute one item of variation. These changes may be due, in part, to changes in temperature caused by changes in the weather and, in part, by the loading of the motor. That is, in the winter when it is cold the resistance losses of the motor will be somewhat less than they are in the summer. Likewise, when the system is initiated in operation, the resistance losses are less than they are when the system has been operating and the motor has become heated to operating temperature. Also depending upon the load carried by the motor, it will reach different operating temperatures. A further variable in the operation of the motor comprises the change in resistance of its main field winding. Its resistance is changed in accordance with the temperature of the motor, and in accordance therewith, the current flowing therethrough is somewhat altered to change the point on the magnetization curve of the motor at which it operates.

There are many conditions which affect the functioning of the generator that is connected to supply current to the motor. Since it operates under widely varying conditions, these results are particularly accentuated. In order to reverse the direction of rotation of the motor, the current flowing through the main field winding of the generator is reversed. Depending upon the degree of reversal there is a change in the residual magnetism of the main poles, which, to a certain extent, will alter the output of the generator for the same setting of the controller. Furthermore, the change in residual magnetism of the interpoles of the generator under these widely varying conditions also to a certain extent introduces another variable factor. The resistance of the main field winding of the generator varies with temperature. As a result, for the same setting of the controller, there may be different values of current flowing through it depending upon its temperature.

The condition of the commutator and brushes of the generator is another important variable factor which affects the operation of the generator. When the generator is first installed or the commutator has been reground, the commutator is in a somewhat roughened condition, thereby causing the contact resistance between it and the brushes to vary. As the generator goes into operation the commutator becomes polished and the contact resistance of the brushes correspondingly varies, although it may reach a substantially constant value after being in operation over a considerable period. Under certain conditions, the commutator becomes grooved or roughened, due to sand or other debris coming into contact with it and being carried underneath the brushes. When the system is subjected to heavy overloads, the brushholders tend to change their position due to the increase in temperature thereof caused by the overload. There is then a tendency for the brushes to be slightly shifted and as a result, a cumulative or differential compounding effect may be present, which introduces another variable factor. There is also some change in the contact drop across the faces of the brushes and through the brushes, due to current flow therethrough. This introduces still another variable factor.

In the circuit connecting the armatures of the motor and generator, it is necessary to introduce joints between the conductors. The contact resistance of these joints varies to some extent with the temperature caused by the weather and by the current flowing therethrough. As a result, there is some change in the resistance of the load circuit under these varying conditions.

Since all of the foregoing variable characteristics enter into the operation of a Ward-Leonard control system employed for operating an elevator car in a hatchway, it has been necessary in the past to make certain compromises in its functioning and to permit certain variations in the speed of the elevator car from the desired speeds. It has not been possible heretofore to operate the elevator car in the hatchway at speeds corresponding to the setting of the controller of the main field winding of the generator, regardless of the load and operating conditions of the system. As the system goes into service it has been necessary in the past to continually make various adjustments in order to compensate for factors which change from time to time. As a result, the maintenance expense has been considerable and it has been necessary to provide a control system which is adjustable over a comparatively wide range, in order to permit the necessary adjustments that were required to be made from time to time.

In order to operate the elevator car so that under all conditions its movement will be independent of all of the foregoing variable characteristics, it is desirable that the speed of the elevator car or the motor mechanically coupled thereto correspond precisely with the setting of the controller for the generator field winding. That is, regardless of these various factors which variably affect the functioning of the system, the speed of movement of the elevator car for each setting of the controller should be constant, regardless of the direction of movement of the elevator car, the load carried thereby, the temperature and operating conditions of the motor and generator, and other variable factors.

The object of my invention, generally stated, is to provide a control system which shall be simple, efficient and accurate in operation and which may be readily and economically manufactured and installed.

An important object of my invention is to provide for operating the motor of a Ward-Leonard control system at various constant speeds, regardless of variable characteristics of the system.

Another important object of my invention is to provide for rendering the functioning of the motor of a Ward-Leonard control system entirely independent of variable characteristics which might otherwise affect the functioning of the motor.

Another object of my invention is to provide for controlling the functioning of the generator of a Ward-Leonard control system in accordance with the speed of the motor in such manner as to maintain the speed of the motor at various predetermined values regardless of the variable operating characteristics of the system.

Still another object of my invention is to provide for controlling the functioning of the generator of a Ward-Leonard control system in accordance with departures of the speed of the motor from predetermined speeds and in accordance with the magnitude of the departures.

A further object of my invention is to provide a regulating generator having its armature connected in series circuit relation with the main generator field winding of a Ward-Leonard control system and arranged to cause current to flow through the main generator field winding in accordance with the current and voltage applied to the motor of the Ward-Leonard system by the generator and the current flowing through the main generator field winding.

A still further object of my invention is to provide a regulator generator having its armature connected in series circuit relation with the main generator field winding of a Ward-Leonard control system, one of its field windings connected to be responsive to the current supplied to the motor of the Ward-Leonard system by the generator, another of its field windings connected to be responsive to the voltage applied to the motor, and a third field winding connected to be responsive to the current flowing through the main generator field winding.

Other objects of my invention will, in part, be obvious and, in part, appear hereinafter.

My invention, accordingly, is disclosed in the embodiment hereof shown in the accompanying drawings, and comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawings, in which:

Figure 1 illustrates diagrammatically the arrangement of an elevator car in a hatchway;

Fig. 2 is a view, in side elevation, showing the construction of a controller used for varying the resistance connected in circuit with the main field winding of the generator;

Fig. 3 is a view, partly in side elevation and partly in section, of a typical arrangement of the contact members of the controller shown in Fig. 2;

Figure 4:
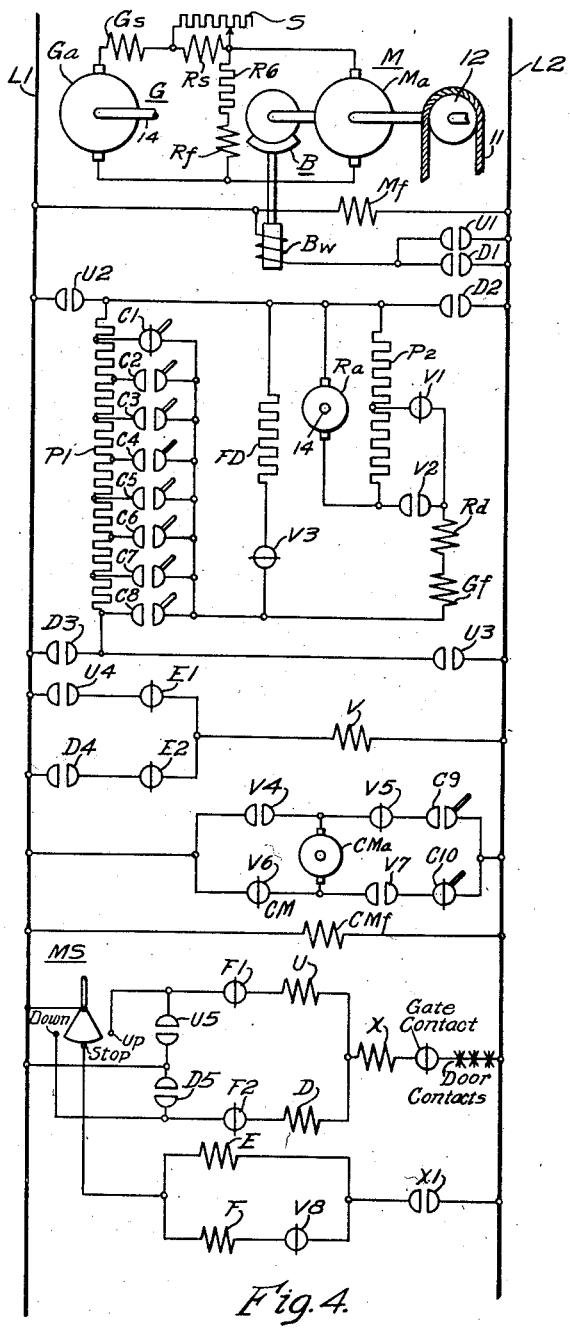
Fig. 4 illustrates diagrammatically one modification of my invention.
Figure 4A:
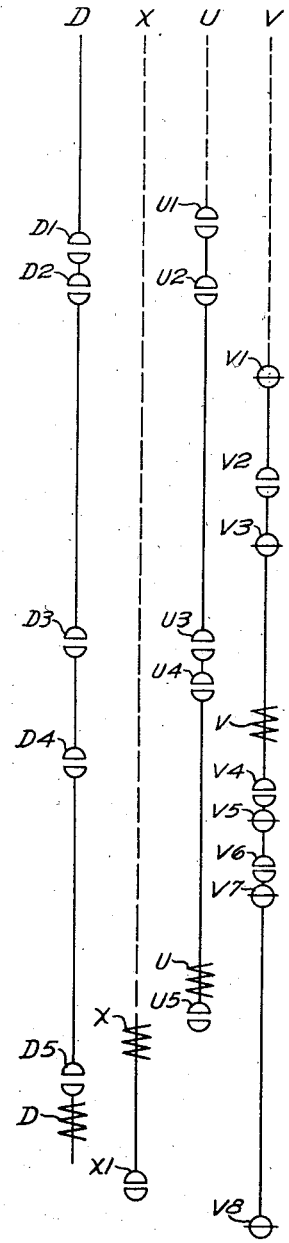
Fig. 4A shows the relationship between certain of the various operating windings and contact members of the relays and switches illustrated in Fig. 4.

In order to practice my invention, a Ward-Leonard control system is provided in which the motor is mechanically coupled as set forth hereinbefore to operate the elevator car in the hatchway. The motor is provided with a separately excited field winding which is arranged to be energized in a single direction only. A generator is provided having its armature connected to the armature of the motor. The generator may be provided with a series field winding to compensate for the IR drop in the armature circuits. The control of the speed of the motor, and consequently, of the elevator car, as well as the direction thereof, is controlled by varying the amount and direction of the excitation of the main field winding of the generator. This control may be effected in a few or many steps, depending upon the type of operation which is desired.

In order to maintain the speed of the motor at various constant values corresponding to various settings of the controller used for controlling the current flowing through the main field winding of the generator, a regulator-generator is provided which is arranged to measure the speed and load of the motor and the current flowing through the main field winding of the generator. The armature of the regulator-generator is arranged to be connected in series circuit relation with the generator field winding so that the voltage generated in the armature in response to the speed and load of the motor and the current flowing through the generator field winding will cause a current to flow through the main generator field winding which will be a function of the departure of the motor speed from a predetermined value corresponding to the particular setting of the controller of the main field winding. Under certain load and operating conditions, no voltage will be generated in the armature of the regulator-generator since, under these conditions, the speed of the motor corresponds to the setting of the controller. For all other conditions, however, a voltage will be generated in the armature of the regulator-generator in such direction and value as to cause the required current to flow through the main field winding of the generator to operate the motor at the desired speed.

In order to measure the speed and load applied to the motor, the regulator-generator is provided with a series field winding through which all or a portion of the current from the generator flows. The regulator-generator is also provided with a main field winding which is connected to be responsive to the voltage applied to the motor. These two field windings are differentially related so that the resulting flux is a function of the speed of the motor, as measured by its counter E. M. F., that is, the flux generated by the series field winding is proportional to the IR drop of the motor armature, and the flux generated by the main field winding of the regulator-generator is proportional to the voltage impressed across the terminals of the armature of the motor. Thus, the resulting flux due to the differential relationship between the two field windings, is a function of the counter E. M. F. of the motor. Since this flux results from the combined action of the current flowing through the motor armature and the voltage applied thereto, it is also a function of the load carried by the motor. The voltage which is generated in the armature of the regulator-generator due to this resulting flux is then a function of the speed of the motor and the load carried thereby.

It is desirable that any change caused by the voltage generated in the regulator armature and affecting the current flowing through the main field winding of the generator be immediately reflected in the voltage in the armature of the regulator generator. Such action is desired in order to prevent hunting of the system. As soon as a voltage appears in the armature of the regulator-generator indicating that the speed of the motor has departed from the desired speed, a change in the flow of current through the main field winding of the generator takes place in such direction as to tend to restore the speed of the motor to the desired speed. If some means is not provided for immediately effecting a corresponding change in the corrective voltage generated in the armature of the regulator-generator, the resulting change in the fluxes of the series and main field windings of the regulator-generator in response to the corrective effect will take place too late. As a result, the speed of the motor will be altered more than is desired and hunting will result.

In order to make the correction applied by the regulator-generator proportional to the departure of the speed of the motor from the desired speed corresponding to a particular setting of the controller for the main field winding of the generator, a differential field winding is provided in the regulator-generator and is connected in series circuit relation with the main field winding of the generator. Thus, any change in current which flows through the main generator field winding is immediately reflected in the voltage which is generated by the armature of the regulator-generator. It is then unnecessary to await the correction in the speed of the motor as reflected in the change in the fluxes generated by the series and main field windings of the regulator-generator to correspondingly affect the voltage generated by the armature of the regulator-generator. The differential field winding of the regulator-generator is arranged to generate a flux in the same direction as the flux generated by the series field winding of the regulator-generator and, therefore, it opposes or is differentially related to the flux which is generated by the main field winding of the regulator-generator. There is always then a certain relationship between the speed and load of the motor and the corrective effect caused thereby in altering the flow of current through the main field winding of the generator. As a result, the system is free from hunting and the speed of the motor is maintained at predetermined values corresponding to various settings of the controller regardless of the many variable conditions which would otherwise affect the speed and cause it to change from the desired values.

Referring now particularly to Fig. 1 of the drawings, the reference character 10 designates, generally, an elevator car which may be supported in a hatchway or shaft by means of a cable 11 which is passed over a sheave 12 and balanced by suitable counterweights 13. The elevator car 10 is provided with a slowdown inductor relay E and a landing inductor F. The slowdown inductor relay E is provided with normally closed contact members E1 and E2 while the landing inductor F is provided with normally closed contact members F1 and F2. When the operating winding of the slowdown inductor relay E is energized no action takes place until the contact members E1 or E2 come into proximity, respectively, with the inductor plates UE and DE, depending upon the direction of travel of the elevator car. Assuming that the elevator car 10 is traveling in the up direction and that the operating winding of the slowdown inductor relay E is energized, the contact members E1 will be opened as soon as they are moved into proximity to the inductor plate UE. A resulting control function then takes place which will be set forth hereinafter. The contact members F1 and F2 of the landing inductor relay F are also opened when they come into proximity, respectively, to the inductor plates UF and DF. The elevator car 10 is also provided with a master switch MS having three positions, the extreme outer positions corresponding to up and down movement of the car, and the central position to a position to stop the car.

In order to operate the elevator car 10 in the hatchway, a Ward-Leonard control system is provided which comprises a motor M that is arranged to be mechanically coupled, as illustrated, to the sheave 12. As shown in Fig. 4 of the drawings, the motor M comprises an armature Ma and a main field winding Mf, the latter being arranged to be separately excited from energized conductors L1 and L2. A brake B is provided having a brake releasing winding Bw for releasing it on energization of the motor M.

Figure 6:
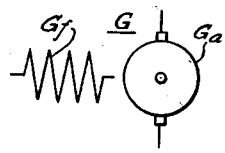
Fig. 6 illustrates schematically the arrangement of the generator armature and main field winding.

The motor is arranged to be energized by means of a generator G having, as shown in Figs. 4 and 6, an armature Ga, a series field winding Gs and a main field winding Gf. The armature Ga of the generator G is arranged to be mounted on a shaft 14 which may be driven by any suitable motive means, such as an induction motor (not shown) that may be connected to an alternating-current source of supply.

Figure 5:
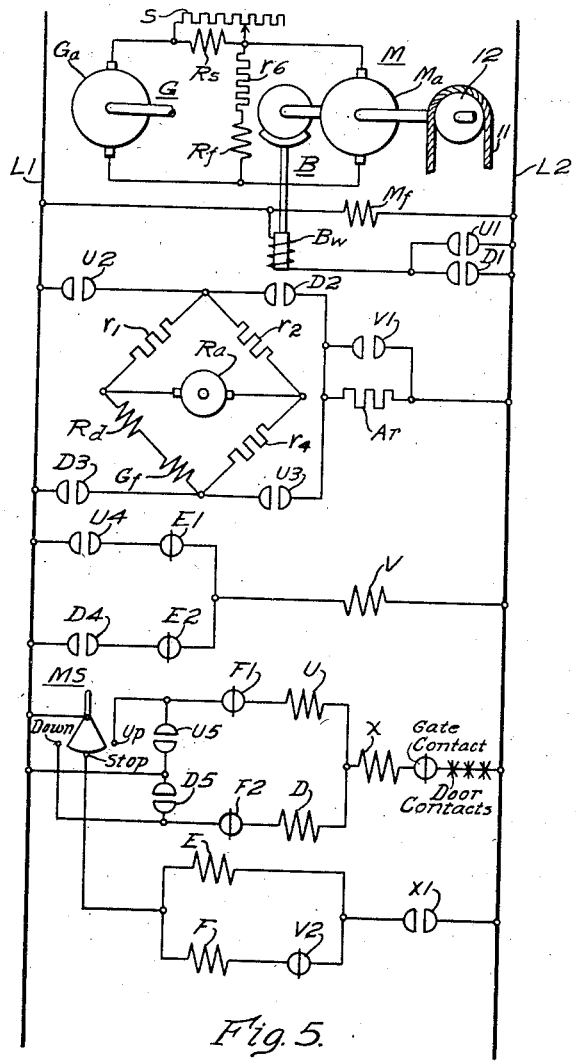
Fig. 5 illustrates diagrammatically another system in which my invention may be employed.
Figure 5A:
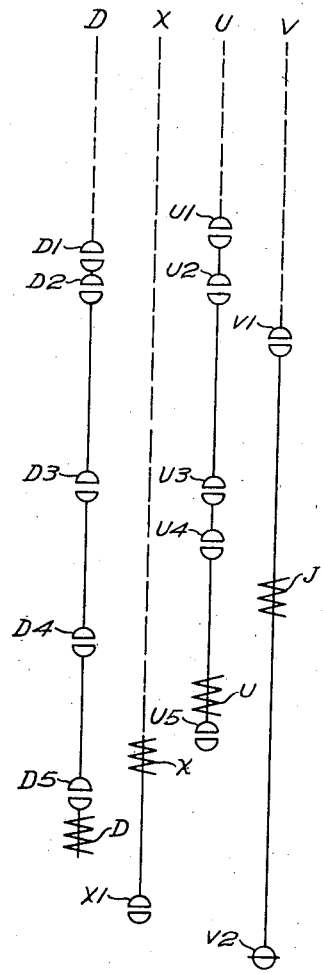
Fig. 5A illustrates the physical arrangement of certain of the operating windings and contact members of the relays and switches illustrated in Fig. 5.
Figure 7:
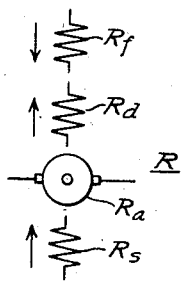
Fig. 7 illustrates schematically the arrangement of the regulator-generator armature and its field windings.

In order to control the functioning of the system, a regulator-generator R is provided having an armature Ra which may be mounted on the shaft 14. As shown in Fig. 7 of the drawings, the regulator generator R is provided with a main field winding Rf, a differential field winding Rd and a series field winding Rs. As indicated by the arrows, the differential field winding Rd and the series field winding Rs are arranged to generate fluxes in a direction opposite to the direction of the flux generated by the main field winding Rf of the regulator-generator. The particular connections for the various field windings and the armature of the regulator-generator R are illustrated in Figs. 4 and 5 of the drawings, and they will be set forth in detail hereinafter.

In response to the operation of the master switch MS, up or down reversing switches U and D are operated. On the operation of either of the up or down switches, an auxiliary switch X is operated to complete a circuit for energizing the operating windings of the inductor relays E and F.

As soon as either the up or the down switch U or D is operated, a potentiometer P1 is connected across the conductors L1 and L2. The current flowing through the potentiometer P1 is in one direction when the up reversing switch U is energized, and is in a reverse direction when the down reversing switch D is energized.

In order to accelerate the motor M, the current flowing through the main generator field winding Gf is increased by increasing the voltage applied thereto from the potentiometer P1. This voltage is gradually increased by the successive closure of contact members C1 through C8, which as shown in Figs. 2 and 3 of the drawings, are arranged to be successively closed by means of a control motor CM. The control motor CM is arranged to operate through a reduction gearing mechanism 15 to rotate a shaft 16 on which a series of cams 17, composed of insulating material, is mounted. As shown more clearly in Fig. 3 of the drawings, a cam 17 is arranged to engage a roller 18 on the periphery thereof and to normally hold a movable contact member 19 out of engagement with a fixed contact member 20. The cam 17 is provided with a recessed portion 21 which is arranged to permit the roller 18 to move under the influence of a biasing spring 22, so that the movable contact member 19 is permitted to engage the fixed contact member 20. It will be understood that the cams 17 may be positioned on the shaft 16 in any desired relative positions to effect the sequential opening and closing of the contact members C1 through C8, as may be desired. In order to stop the operation of the control motor CM after it has reached its limit of travel, contact members C9 and C10 are provided. The contact members C10 are arranged to remain in the closed position until the control motor has reached its limit of travel after being initially energized. At this time contact members C10 are opened to terminate further motion of control motor CM in this direction, contact members C9 having been closed on the energization of the motor CM. The contact members C9 are arranged to remain in the closed position until the control motor CM has been restored to the initial position, at which time they are opened. It will be understood that the cams 17 associated with these contact members may be suitably arranged to effect this desired operation.

As illustrated in Fig. 4 of the drawings, the control motor CM is provided with an armature CMa and a separately excited field winding CMf.

The direction of rotation of the armature CM$a$ is effected by reversing the polarity of the voltage applied thereto from the conductors L1 and L2 by means of a speed relay V.

Before describing in detail the functioning of the control system illustrated in Fig. 4 of the drawings, the particular connections for the field windings of the regulator-generator R will be pointed out. It will be observed that the series field winding R$s$ is connected to be responsive to the current flowing between the generator armature G$a$ and the motor armature M$a$. The proportion of this current flowing through the series field winding R$s$ may be adjusted by means of a shunt S. The main field winding R$f$ of the regulator-generator R is connected to be responsive to the voltage which is applied to the motor armature M$a$. In order to reduce the effect of the temperature rise of the main field winding R$f$, due to the current flowing therethrough, it is connected in series circuit relation with a resistor $r6$ so that a principal part of the voltage drop is consumed in the resistor, leaving the balance to be consumed in the main field winding R$f$. The differential field winding R$d$ of the regulator generator R is connected to be responsive to the current flowing through the main generator field winding G$f$ and as illustrated, it may be connected in series circuit relation therewith. The differential field winding R$d$ and the main generator field winding G$f$ are arranged to be energized not only from the conductors L1 and L2, in accordance with the voltage obtained from the potentiometer P1, but they are also arranged to be energized from a voltage which is obtained from the armature R$a$ of the regulator generator R. The voltage which is obtained from the regulator-generator R$a$ may be varied somewhat by means of a potentiometer P2, the connections to which are controlled by means of the speed relay V.

In describing the operation of the system shown in Fig. 4 of the drawings, it will be assumed that the conductors L1 and L2 have applied thereto a suitable control voltage, that the generator G and the regulator-generator R are being operated at the proper speed and that it is desired to move the elevator car 10 in the up direction. The operator then moves the master switch MS to the up position to effect the energization of the operating winding of the up reversing switch U, as well as the energization of the operating winding of the auxiliary switch X. The circuit for effecting the energization of these windings may be traced as follows:

L1, MS, up contacts, F1, U, X, gate contact, door contacts, L2.

At contact members U5 a holding circuit is provided around the master switch MS. The brake winding B$w$ is released in response to the operation of the up reversing switch U. The circuit for releasing the brake winding may be traced as follows:

L1, B$w$, U1, L2.

The potentiometer P1 is connected directly across the conductors L1 and L2 on the closure of contact members U2 and U3 in response to the operation of the up reversing switch U. Current is then caused to flow through the main generator field winding G$f$ in part because of the voltage which is obtained from the first section of the potentiometer P1, due to the fact that contact members C1 are closed, and partly because of the voltage which is obtained from the armature R$a$ of the regulator-generator R.

The operating winding of the speed relay V is energized in response to the operation of the up reversing switch U over a circuit which may be traced as follows:

L1, U4, E1, V, L2.

As a result of the energization of the speed relay V a circuit is completed for energizing the armature CM$a$ of the control motor CM. This circuit may be traced as follows:

L1, V4, CM$a$, V7, C10, L2.

The contact members C1 are then opened and the remaining contact members C2 through C7 are successively closed and opened, contact members C8 being closed but not opened, thereby increasing the voltage which is applied to the main generator field winding G$f$ to correspondingly increase the voltage which is applied to the armature M$a$ of the motor M. As soon as the contact members C10 are opened, the armature CM$a$ is deenergized and contact members C8 remain closed.

The effectiveness of the voltage which is obtained from the regulator generator armature R$a$ is increased on the closure of contact members V2 of the speed relay and the opening of contact members V1. This change in the connections to the potentiometer P2 permits the regulator generator R to be more effective in assisting the series field winding G$s$ of the generator G in compensating for the IR drop in the armature circuits of the generator G and the motor M.

As has been set forth hereinbefore, it is desirable that the speed of the motor M be at a certain value for each of the steps of control voltage obtained from the potentiometer P1. It is then possible to obtain a smooth acceleration curve which will be unaffected by the many variables in the system that have been set forth in detail hereinbefore. In addition, it is also desired that the same speed relationship exist when the contact members C1 through C8 are operated in a reverse order to effect the deceleration of the motor M and the elevator car driven thereby.

I have found that the desired speed relationship will exist regardless of the variable characteristics of the elevator system when the regulator-generator R is employed and its field windings are connected as shown. Because of the connection of the differential field winding R$d$ in series circuit relation with the main generator field winding G$f$, the changes which are introduced to effect a corrective action through the generator G are immediately reflected in the voltage which is generated in the armature R$a$ of the regulator-generator. As a result, the corrective effect which is applied by the regulator-generator R is in a sense proportional to the degree of variation in the speed of the motor M from the desired speed.

When it is desired to stop the elevator car at a particular floor, the operator centers the master switch, thereby completing a circuit for energizing the operating winding of the slowdown inductor relay E. This circuit may be traced as follows:

L1, MS, stop contacts, E, X1, L2.

As soon as the contact members E1 come into proximity with the up inductor plate UE, they are opened and the previously traced energizing circuit of the operating winding speed relay V is opened. At contact members V3 a circuit is completed for connecting a field discharge resistor FD across the generator field winding Gf in order to permit a less abrupt change in the current flowing therethrough during the deceleration period. Since it is unnecessary to employ the maximum effectiveness of the regulator generator R, the potentiometer P2 is again inserted in the circuit on the opening of contact members V2 and the closure of contact members V1.

The armature of the control motor CMa is energized in a reverse direction to effect the operation of the contact members C1 through C8 in a reverse sequence. The circuit for now energizing the control motor armature CMa may be traced as follows:

L1, V6, CMa, V5, C9, L2.

The contact members C7 through C2 are successively closed and opened to effect a decrease in the flow of current through the main generator field winding Gf. During this interval, the regulator generator R is effective to maintain the speed of the motor M at values corresponding to the contact members which are closed. As a result, regardless of the variable conditions or loading of the elevator system, the elevator car 10 will be decelerated at a uniform rate.

A further result of the deenergization of the speed relay V is to close contact members V8 and to complete an obvious energizing circuit for the operating winding of the landing inductor relay F in parallel with the operating winding of the slowdown inductor relay E. As soon as contact members F1 come into proximity with the up inductor plate UF, the previously traced energizing circuit for the operating winding of the up reversing switch U and the auxiliary switch X is opened. These switches are deenergized. The potentiometer P1 is disconnected from the conductors L1 and L2 and the previously traced energizing circuit for the brake winding Bw is opened. The brake B is then applied and the elevator car 10 is brought to rest at the desired floor.

In order to further point out the application of my invention, reference may be had in Fig. 5 of the drawings. The circuit connections there shown are identical with those shown in Fig. 4, with the exception that the potentiometers P1 and P2, the control motor CM, and the field discharge resistor FD are omitted. Also, the connections for the armature Ra of the regulator generator are somewhat altered and the speed relay V is arranged to short circuit an accelerating resistor Ar to permit the operation of the motor M at full speed in one step. Since the regulator-generator R has a sufficient range of control to compensate for the IR drop in the armature of the motor M and the generator G, the series field winding Gs may be omitted.

As shown on Fig. 5 of the drawings, the armature Ra of the regulator-generator is connected across two of the opposite terminals of a Wheatstone bridge, one leg of which comprises the differential field winding Rd of the regulator-generator, and the main field winding Gf of the generator G. The remaining legs of the Wheatstone bridge comprise resistors r1, r2, and r4. The opposite terminals of the Wheatstone bridge not connected to the armature Ra are arranged to be connected to the conductors L1 and L2 and these connections may be reversed by means of the up and down reversing switches U and D.

A detailed description of the functioning and theory of operation of the Wheatstone bridge is set forth in the copending application of Santini and myself, Serial No. 38,770 filed August 31, 1935, and assigned to the assignee of this application.

Since the sequence of operation of the system shown in Fig. 5 of the drawings is somewhat similar to that set forth hereinbefore in connection with Fig. 4, only the portion necessary to illustrate the function of the Wheatstone bridge will now be set forth. As soon as the master switch MS is operated to the up position, for example, contact members U2 and U3 are closed to connect the Wheatstone bridge in series circuit relation with the accelerating resistor Ar and across the conductors L1 and L2. The brake winding Bw is energized and the motor M is then energized to move the elevator car in the up direction. The voltage which is applied to the main generator field winding Gf of the generator G is then a function of the voltage existing across the conductors L1 and L2, less the voltage which is consumed in the accelerating resistor Ar, and is further proportional to the voltage which is generated in the armature Ra of the regulator-generator. As is set forth in the copending application referred to hereinbefore, the voltage which is generated by the armature Ra may be independently applied to the generator field winding Gf and this effect will be entirely independent of the effect which is caused by the voltage which is applied thereto from the source represented by the conductors L1 and L2.

When the speed relay V is energized, contact members V1 are closed to short circuit the accelerating resistor Ar and the Wheatstone bridge circuit is then connected directly across the conductors L1 and L2. The regulator-generator R then functions to maintain the proper current in the generator field winding Gf, so that the motor M will operate at a fixed speed regardless of the load or variable conditions affecting it.

Since certain further changes may be made in the foregoing construction and different embodiments of the invention may be made without departing from the scope thereof, it is intended that all matter shown in the accompanying drawings or set forth in the foregoing description shall be interpreted as illustrative and not in a limiting sense.

I claim as my invention:

1. In a Ward-Leonard control system, in combination, a first dynamo-electric device operatively connected to a load, a second dynamo-electric device electrically connected to said first device, a field winding for said second device, a third dynamo-electric device disposed to be responsive to the current flowing between and the voltage across said first and second devices for controlling the current flowing through said field winding, and a field winding in said third device connected to be responsive to the current flowing through said first-mentioned field winding for opposing the functioning of said third device in response to changes in the current flowing between and the voltage across said first and second devices.

2. In a Ward-Leonard control system, in combination, a first dynamo-electric device operatively connected to a load, a second dynamo-electric device electrically connected to said first device, a main field winding for said second device, a third dynamo-electric device for controlling the current flowing through said main field winding, said third device being provided with series and shunt field windings disposed respectively to be responsive to the current flowing between and the voltage across said first and second devices, and means responsive to changes caused in said main field winding in response to changes in current flow through said series and shunt field windings for effecting a further control of the functioning of said third device.

3. In a Ward-Leonard control system, in combination, a first dynamo-electric device operatively connected to a load, a second dynamo-electric device electrically connected to said first device, a main field winding for said second device, a third dynamo-electric device for controlling the current flowing through said main field winding, said third device being provided with series and shunt field windings disposed respectively to be responsive to the current flowing between and the voltage across said first and second devices, and means responsive to changes in current flow through said main field winding in response to changes in current flow through said series and shunt field windings for opposing the functioning of said third device in further changing the current flowing through said field winding.

4. In a Ward-Leonard control system, in combination, a first dynamo-electric device operatively connected to a load, a second dynamo-electric device electrically connected to said first device, a main field winding for said second device, a third dynamo-electric device for controlling the current flowing through said main field winding, said third device being provided with series and shunt field windings disposed respectively to be responsive to the current flowing between and the voltage across said first and second devices, and a differential field winding in said third device connected to be responsive to the current flowing through said main field winding for opposing the functioning of said third device in response to changes in flow of current through said series and shunt field windings.

5. In a Ward-Leonard control system, in combination, a first dynamo-electric device operatively connected to a load, a second dynamo-electric device electrically connected to said first device, a main field winding for said second device, a third dynamo-electric device for controlling the current flowing through said main field winding, said third device being provided with series and shunt field windings disposed respectively to be responsive to the current flowing between and the voltage across said first and second devices, said series and shunt field windings being differentially related to provide a resultant flux substantially proportional to the speed of said first device, and means responsive to the changes caused in said main field winding in response to changes in current flow through said series and shunt field windings for effecting a further control of the functioning of said third device.

6. In a Ward-Leonard control system, in combination, a first dynamo-electric device operatively connected to a load, a second dynamo-electric device electrically connected to said first device, a main field winding for said second device, a third dynamo-electric device for controlling the current flowing through said main field winding, said third device being provided with series and shunt field windings disposed respectively to be responsive to the current flowing between and the voltage across said first and second devices, said series and shunt field windings being differentially related to provide a resultant flux substantially proportional to the speed of said first device, and a third field winding in said third device connected to be responsive to the current flowing through said main field winding and differentially related to said shunt field winding for opposing the functioning of said third device in response to changes in flow of current through said series and shunt field windings.

7. In a Ward-Leonard control system, in combination, a motor operatively connected to a load device, a main generator disposed to energize said motor, a separately excited field winding for said main generator, and an auxiliary generator for controlling the flow of current through said field winding and provided with a series field winding, a main field winding and a differential field winding, said series field winding being disposed to be responsive to the current flow to said motor from said generator, said main field winding being disposed to be responsive to the voltage applied to said motor by said main generator, and said differential field winding being connected in series circuit relation with said separately excited field winding.

8. In a Ward-Leonard control system, in combination, a motor operatively connected to a load device, a main generator disposed to energize said motor, a main field winding for said generator, and an auxiliary generator having an armature connected in series circuit relation with said main field winding, said auxiliary generator being provided with series and shunt field windings disposed respectively to be responsive to the current flowing between and the voltage across said motor and said main generator, and means responsive to changes caused in said main field winding in response to changes in current flow through said series and shunt field windings for effecting a further control of the functioning of said auxiliary generator.

9. In a Ward-Leonard control system, in combination, a motor operatively connected to a load device, a main generator disposed to energize said motor, a main field winding for said generator, and a regulator-generator having an armature connected in series circuit relation with said main field winding, said regulator-generator being provided with series and shunt field windings disposed respectively to be responsive to the current flowing between and the voltage across said motor and said main generator, and means responsive to changes in current flow through said main field winding in response to changes in current flow through said series and shunt field windings for opposing the functioning of said regulator-generator in further changing the current flowing through said field winding.

10. In a Ward-Leonard control system, in combination, a motor operatively connected to a load device, a main generator disposed to energize said motor, a main field winding for said generator, and a regulator-generator having an armature connected in series circuit relation with said main field winding, said regulator-generator being provided with series and shunt field windings disposed respectively to be responsive to the current flowing between and the voltage across said motor and said main generator, and a differential field winding in said regulator-generator connected in series circuit relation with said main field winding for opposing the functioning of said regulator-generator in response to changes in flow of current through said series and shunt field windings.

11. In a Ward-Leonard control system, in combination, a motor operatively connected to a load device, a main generator disposed to energize said motor, a main field winding for said generator, and a regulator-generator having an armature connected in series circuit relation with said main field winding, said regulator-generator being provided with series and shunt field windings disposed respectively to be responsive to the current flowing between and the voltage across said motor and said main generator, said series and shunt field windings being differentially related to effect the generation in said armature of a voltage substantially proportional to the speed of said motor, and means responsive to the changes caused in said main field winding in response to changes in current flow through said series and shunt field windings for effecting a further control of the functioning of said regulator-generator.

12. In a Ward-Leonard control system, in combination, a motor operatively connected to a load device, a main generator disposed to energize said motor, a main field winding for said generator, and a regulator-generator having an armature connected in series circuit relation with said main field winding, said regulator-generator being provided with series and shunt field windings disposed respectively to be responsive to the current flowing between and the voltage across said motor and said main generator, said series and shunt field windings being differentially related to effect the generation in said armature of a voltage substantially proportional to the speed of said motor, and a third field winding in said regulator-generator connected in series circuit with said main field winding and differentially related to said shunt field winding for generating a voltage in said armature in opposition to the voltage generated therein by the resultant effect of said series and shunt field windings.

13. In a direct-current motor control system, a first dynamo-electric machine having an armature, a second dynamo-electric machine having an armature serially connected with said first-mentioned armature and having a field winding, one of said machines being driven at substantially constant speed with variable excitation and the other of said machines being operated as a motor at variable speed, a third dynamo-electric machine having an armature connected to said field winding to vary the voltage applied thereto, said third machine having a separate excitation winding, an excitation circuit connecting said field winding and said separate excitation winding directly in series whereby the current flow in said windings is the same at any instant regardless of the relative time constants of said windings, and additional excitation means for said third machine for supplying a component of excitation thereto substantially proportional to the speed of said machine operated as a motor, said additional excitation means normally acting in opposition to said separate excitation winding whereby said third machine is differentially excited in accordance with the speed of said machine operated as a motor and the current in said excitation circuit.

14. In a direct-current motor control system, a first dynamo-electric machine having an armature, a second dynamo-electric machine having an armature serially connected with said first mentioned armature and having a field winding, one of said machines being driven at substantially constant speed with variable excitation and the other of said machines being operated as a motor at variable speed, a third dynamo-electric machine having an armature connected to said field winding to vary the voltage applied thereto, a separate excitation winding, a shunt type winding connected to respond to the voltage across one of said serially connected armatures, and a series type winding connected to respond to the current in said serially connected armatures, and an excitation circuit connecting said field winding and said separate excitation winding directly in series, whereby the current in said field winding and said separate excitation winding is the same at any instant, regardless of the relative time constants of the latter windings.

15. In a motor control system of the Ward-Leonard type, a motor having an armature, a generator having an armature connected in a loop circuit with said first-mentioned armature and having a generator field winding, said generator being driven at substantially constant speed with variable excitation and said motor being operated at variable speed, an auxiliary generator having an armature connected to said generator field winding to vary the voltage applied thereto, a separate excitation winding, a shunt-type winding connected to respond to the voltage across one of said serially connected armatures, and a series type winding connected to respond to the current in said loop circuit, and an excitation circuit connecting said generator field winding and said separate excitation winding directly in series, said separate excitation and shunt type windings being connected to produce normally opposing magnetomotive forces in said auxiliary generator, and said series type winding being designed to cumulatively compound said generator a sufficient amount to compensate for the voltage losses in said loop circuit caused by resistance.

KENNETH M. WHITE.